A. FULLER.
Car Wheel.
No. 1,824.        Patented Oct. 14, 1840.
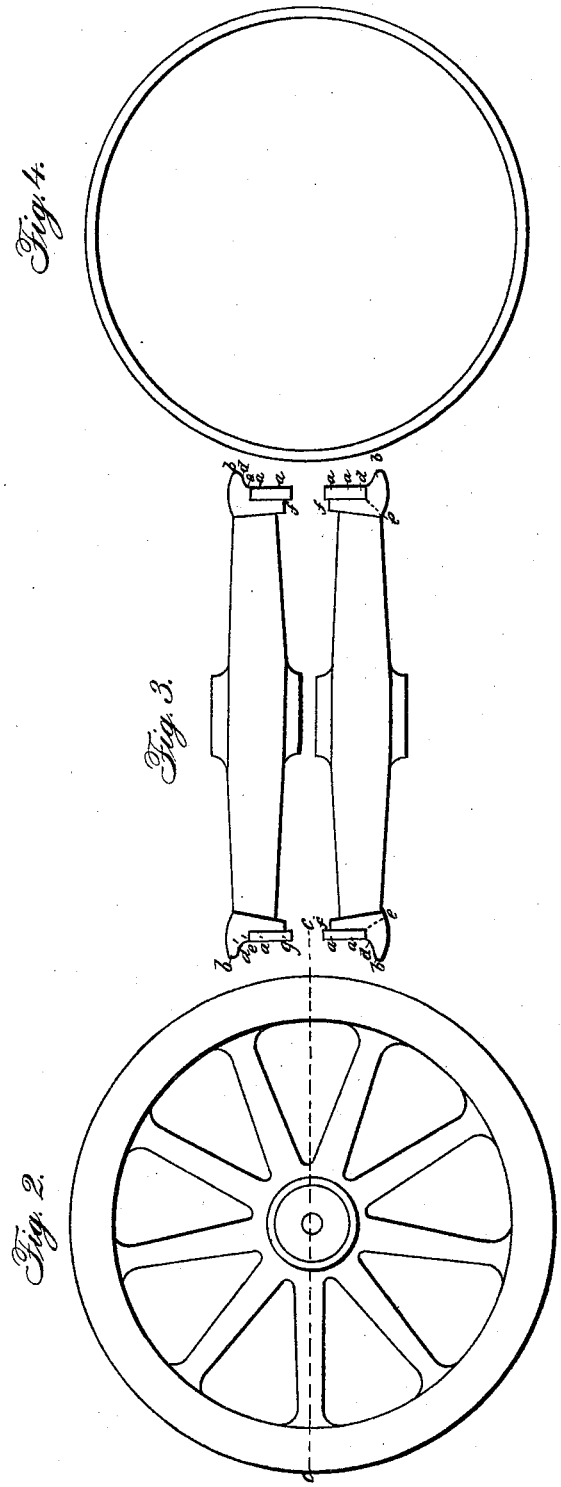
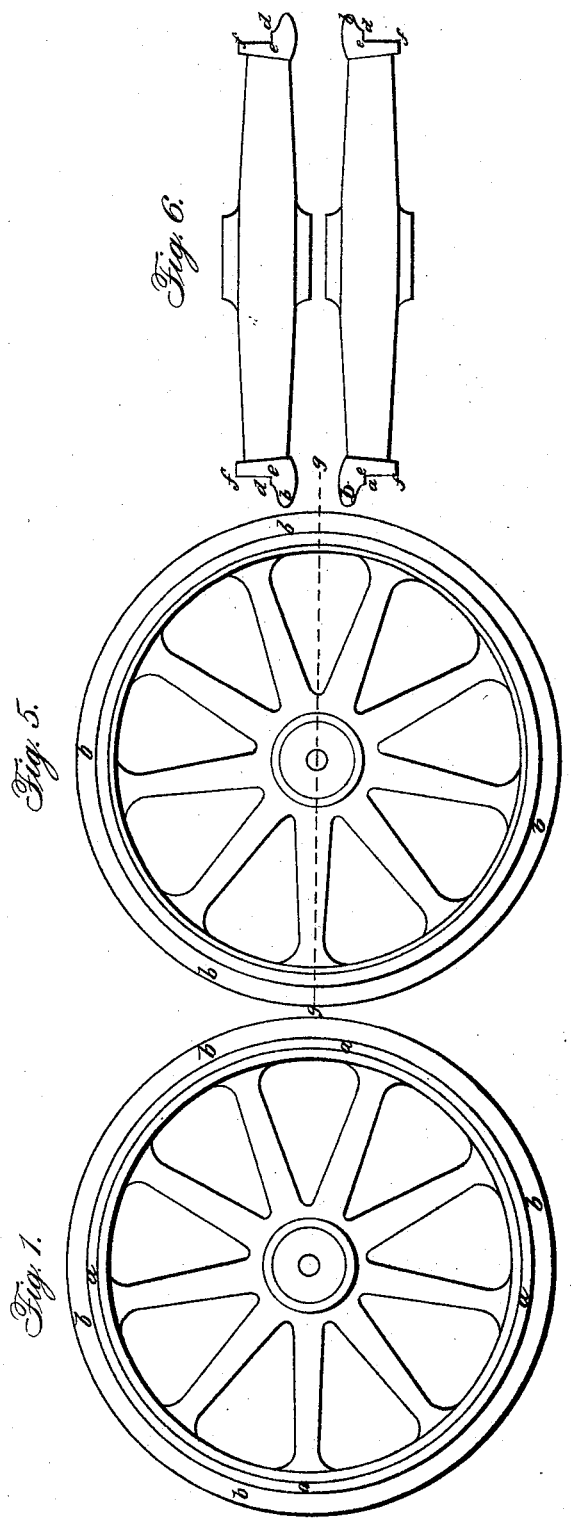

UNITED STATES PATENT OFFICE.

ALBERT FULLER, OF PROVIDENCE, RHODE ISLAND.

MANNER FOR CONSTRUCTING WHEELS FOR RAILROAD-CARS.

Specification of Letters Patent No. 1,824, dated October 14, 1840.

*To all whom it may concern:*

Be it known that I, ALBERT FULLER, of the city and county of Providence and State of Rhode Island and Providence Plantations, have invented a new and useful improvement in wheels used on railroads for passenger-cars and which may be applied to baggage and freight cars and locomotives, called "Fuller's improved wheel," of which the following is a full and exact description.

The hub and spokes of the wheel are the same and made in the same manner as those in common use. The rim and flange of the wheel are cast entire and the flange is cold chilled to harden it which is done by forming the mold in which the wheel is cast with an iron hoop around one side so that the outer side of the flange which bears against the rail is cast on the iron hoop or chill. That part of the rim of the wheel which bears on the rail is sunk from the flange to the outside of the wheel to the depth of one inch more or less and a hoop or tire of wrought iron of the same thickness as the depth of the sink and wide enough to extend from the flange a little beyond the outside of the wheel is placed around the wheel in the sink while hot. The contraction of the hoop as it cools retains it in its place and it is further secured by bolts passing through the hoop and the rim of the wheel fastened by nuts.

In the draft annexed to this specification Figure No. 1 represents the outside of the wheel with the tire $a, a\ a\ a$, in its place. No. 2 is the outside of the same wheel. No. 3, is the section of No. 2 broken in two at the dotted line $c, c$, and represents the section of the wrought iron tire $a, a$, in its place in the sink; the form of the sink is shown in this section in the angle $d, e, f$, the flange from $a$, to $b$, being the part which is chill hardened. $b$, is the flange of the wheel in all the figures. No. 4 represents the edge $a, a$, of the wrought iron tire. No. 5 represents the inside of the wheel without the tire. No. 6, represents the section of No. 5 broken in two at the dotted line $g, g$; the sink without the tire being shown in the angle $d, e, f$.

The advantages of my discovery are that the flange of the wheel being of hardened cast iron is more durable than the wrought iron flange now in use and the wheel can be made much cheaper than in the mode now in use.

I do not claim as my invention the hub spokes or flange of the wheel.

What I claim as my invention and desire to secure by Letters Patent is—

Placing the tire $a$, $a$ in the sink $d, e, f$, in combination with the cast iron chilled flange $b$, for the purpose and in the manner described.

In testimony whereof I the said ALBERT FULLER hereto subscribe my name in the presence of the witnesses whose names are hereto subscribed on the twenty fifth day of September A. D. 1840.

ALBERT FULLER.

Witnesses:
   CHARLES HOLDEN, Jr.,
   PEREZ SIMMONS.